United States Patent
Rose et al.

(10) Patent No.: US 7,257,544 B2
(45) Date of Patent: *Aug. 14, 2007

(54) ASSORTMENT DECISIONS

(75) Inventors: Dawn M. Rose, Randolph, MA (US); Steven M. Leven, Wayland, MA (US); Jonathan W. Woo, Brookline, MA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/172,278

(22) Filed: Jun. 30, 2005

(65) Prior Publication Data

US 2005/0240469 A1    Oct. 27, 2005

Related U.S. Application Data (63) Continuation of application No. 09/826,378, filed on Apr. 4, 2001.

(51) Int. Cl.
*G06F 17/30* (2006.01)

(52) U.S. Cl. .......................... 705/10; 705/8

(58) Field of Classification Search .............. 705/7, 705/8, 10
See application file for complete search history.

(56) References Cited

U.S. PATENT DOCUMENTS

| | | | |
|---|---|---|---|
| 5,101,352 A * | 3/1992 | Rembert | 705/8 |
| 5,450,314 A * | 9/1995 | Kagami et al. | 706/46 |
| 6,151,582 A * | 11/2000 | Huang et al. | 705/8 |
| 6,205,431 B1 * | 3/2001 | Willemain et al. | 705/10 |
| 6,341,269 B1 * | 1/2002 | Dulaney et al. | 705/22 |
| 6,366,890 B1 * | 4/2002 | Usrey | 705/10 |
| 6,493,678 B1 * | 12/2002 | Foster et al. | 705/28 |
| 6,963,847 B1 * | 11/2005 | Kennedy et al. | 705/8 |
| 6,976,001 B1 * | 12/2005 | Levanoni et al. | 705/10 |
| 6,978,249 B1 * | 12/2005 | Beyer et al. | 705/10 |
| 7,092,929 B1 * | 8/2006 | Dvorak et al. | 705/28 |
| 2002/0072977 A1 * | 6/2002 | Hoblit et al. | 705/22 |
| 2003/0033180 A1 * | 2/2003 | Shekar et al. | 705/7 |
| 2003/0195791 A1 * | 10/2003 | Waller et al. | 705/10 |

FOREIGN PATENT DOCUMENTS

JP        411288427 A    * 10/1999

OTHER PUBLICATIONS

Screenshots of Technology Strategy, Inc., www.grossprofit.com, Mar. 2, 2000 [retrieved on Jan. 7, 2003], 9 pages, retrieved from: Google.com and archive.org.*

Merritt, Jennifer, "Company makes Science out of Shopping Trends", Boston Business Journal, Sep. 3, 1998 [retrieved on Jan. 7, 2003 ], 3 pages, retrieved from: Google.com and archive.org.*

(Continued)

*Primary Examiner*—B. Van Doren
(74) *Attorney, Agent, or Firm*—Chapin IP Law, LLC; Barry W. Chapin, Esq.

(57) ABSTRACT

Historical information is stored about demand behavior associated with different sizes of styles of items of commerce. A size assortment recommendation is generated based on the stored historical information and on objectives with respect to purchase or allocation decisions about assortments of the different sizes.

27 Claims, 6 Drawing Sheets

OTHER PUBLICATIONS

Ackerman, Jerry, "Looking Back to Fashion's Future", The Boston Globe, Oct. 7, 1998 [retrieved Jan. 7, 2003], 3 pages, retrieved from: archive.org and Google.com.*

Koloszyc, Ginger, "Merchants Try Complex Mathmatical Tools to Improve Inventory Decisions", Stores Magazine, Nov. 1999 [retrieved Jan. 7, 2003], 3 pages, retrieved from: Google.com and archive.org.*

"Technology Strategy, Inc. Names Jonathan Woo as Director of R&D", TSI Press Release, Jul. 15, 1998 [retrieved Jan. 7, 2003], 1 page, retrieved from: Google.com and archive.org.*

"Gymboree Selects TSI to Design and Implement Inventory Optimization and Pricing Solution", TSI Press Release, Jan. 13, 1999 [retrieved Jan. 7, 2003], 2 pages, retrieved from: Google.com and archive.org.*

Datz, Todd, "Pythagorean Pantsuits-Modeling Merchandise", CIO Magazine, Feb. 15, 1999 [retrieved Jan. 7, 2003], 1 page, retrieved from: Google.com and archive.org.*

"Kmart looks to broaden its Category Management System", HFN, Jun. 30, 1997 [retrieved Aug. 5, 2005], vol. 71, No. 26, pp. 1-2, retrieved from: Dialog, file 9.*

Silver, Edward A., et al., "Inventory Management and Production Planning and Scheduling", John Wiley and Sons, Inc., 1998, pp. 382-403.*

* cited by examiner

ASSORTMENT DECISIONS

This application is a continuation of U.S. patent application Ser. No. 09/826,378, filed Apr. 4, 2001, entitled "Assortment Decisions", the teachings of which are incorporated herein by reference.

BACKGROUND

This invention relates to assortment decisions.

One of the decisions that face retailers and suppliers is the choice of assortments of retail items to be bought or distributed. The assortment may represent, for example, the number of each size of an item of apparel (a man's dress shirt), an accessory (a belt), home furnishings (a flannel sheet), or any other type of merchandise that is bought and sold by size. If the wrong assortments are bought or distributed, the resulting under- and over stocking by size may lead to lost profit because of missed sales and excessive markdowns, customer dissatisfaction due to unavailable sizes, and excessive operational costs due to expedited shipping or store-to-store transfers.

SUMMARY

In general, in one aspect, the invention features a method that includes storing historical information about demand behavior associated with different sizes of styles of items of commerce and generating a size assortment recommendation based on the stored historical information and on objectives with respect to purchase or allocation decisions about assortments of the different sizes.

Implementations of the invention may include one or more of the following features. The size assortment recommendation is generated based also on operational constraints associated with the purchase or allocation decisions. The historical information is stored separately for each style offered at each of multiple commerce locations or for each style offered in multiple time periods. The generation of a size assortment recommendation includes determining size profiles each representing a distribution of percentages of sales by size within one of the styles. The operational constraints include a limitation on the granularity of purchase and allocation decisions that can be implemented.

The generation of a size assortment recommendation includes determining size profiles for each representing a distribution of percentages of sales by size within one of the styles, and optimizing the number of size profiles by assigning them to groups. A representative size profile is substituted for all of the size profiles of each of the groups.

The optimization is based on the objectives and on a genetic algorithm. The optimization yields a determination of the optimal number of groups. The size assortment recommendation is an optimal assortment, and simulations are performed on the optimal assortment to derive a risk profile of outcomes.

Error bound information is generated from size profiles for multiple styles and multiple time periods. The error bound information is used to optimize size profiles based on the objectives. The determination of size profiles includes filtering historical data to data representative of a supply-unconstrained environment. The filtering includes eliminating data for styles for which not all sizes are present for a given commerce location and a given time period.

In general, in another aspect, the invention features a method that includes (1) displaying to a user recommended size profiles for allocating a style of an item of commerce to retail outlets based on a predefined objective function, (2) enabling the user to specify alterations in an analysis that formed a basis of the recommended size profiles, and (3) displaying to the user the impact of the alterations in terms of sales dollars, gross profit, size break week, or stockout week.

Other advantages and features will become apparent from the following description and from the claims.

DESCRIPTION

INTRODUCTION

We describe how to generate, for example, optimal size assortment recommendations for retail items that can be used to support purchase or allocation decisions. By purchase decisions, we mean decisions about the proportion of quantities spread across sizes for various styles of retail items to be bought. By allocation decisions (which we also sometimes call distribution decisions), we mean decisions about how to allocate available inventories of different sizes of items among store locations and time periods. Purchase decisions are typically made far in advance of the selling season and for the entire chain, while allocation decisions are made just before the selling season begins, and vary by store.

The size assortment recommendations that are generated by the methods discussed below are intended to (1) reflect the unique historical demand behavior of the retailer or supplier's customer base, (2) support the retailer or supplier's strategic objectives, and (3) incorporate system or operational limitations. When implemented, the size assortment recommendations enable the retailer or supplier to enhance its profits within the confines of its strategic inventory goals and operational realities.

Figure 1:
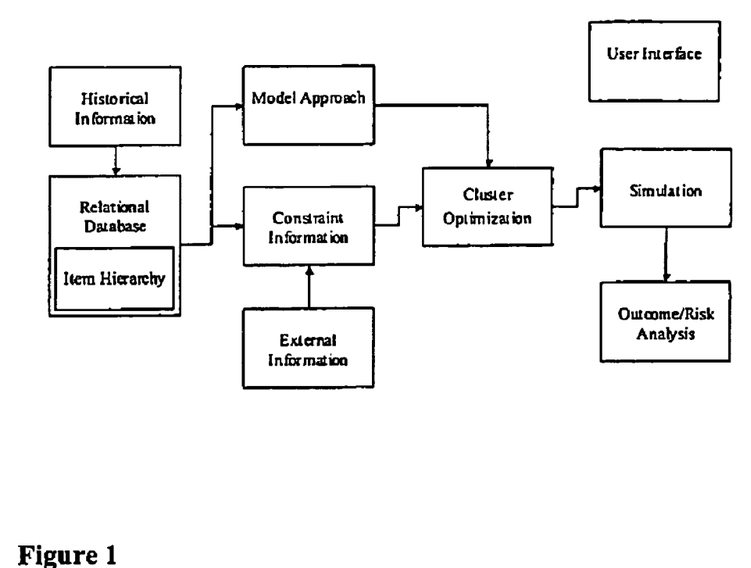
FIG. 1 shows a block diagram.

As shown in FIG. 1, a retailer (or a supplier to a retailer) typically maintains large volumes of computer-stored historical information 10 about sales of merchandise. The information may include data for each item sold (for example, girls shoe style 231 in dark brown, size 4AAA), the identity of each store in which it was sold, and each of a series of periods of time during which it was sold. For each item/store/time-period combination, the data may include the number of units, price, and cost of sales and inventory of that item sold in that store in that time period.

Retailing patterns for the different items, stores, and periods can be inferred from the historical information. An item hierarchy provides the key to which items may be treated together as representing a common pattern (for example, all sizes of girls shoe style 231 in dark brown might be patterned together). A collection of items that differ only by size will be referred to generically as a style.

The historical retailing patterns can be used to predict sales and profits by size that may result from assumed size-assortment inventory decisions and price decisions for the same styles, stores, and time periods that are represented by the historical patterns, or for other similar styles, stores, and time periods. With improved purchase and distribution decisions by size, retailers and suppliers can increase their profits and customer service by better matching inventory to demand.

Size Profile Function

The patterns derived from the historical data for a given style in a given store over a given period of time are represented by a function (called a size profile function) that represents a distribution of observed percentages of relative sales strength by size within that style. The size profile function can be used to make pre-season inventory investment and in-season inventory distribution decisions by size for each style in each store over a given time period.

Generally, operational constraints limit retailers (or suppliers) from executing such purchase and allocation decisions at a per-style/store/time-period level of granularity. There is typically a bound on the number of unique realizations of size profiles that can be acted upon across the merchandise/location/time dimensions. This bound introduces a degree of sub-optimality in making size recommendations.

To minimize this effect, the large set of fine-grained size profile functions are processed by an optimization routine that assigns the relatively large number of size profiles to a small number of groups. A representative size profile is then calculated for each group, so that every style/store/time-period member of a given group is assigned to the same representative size profile. The optimization engine is capable of both finding the optimal groups for a specified maximum number of groups, and for recommending how many groups should be maintained by the retailer.

Once the optimal size profiles are determined for a given set of constraints and retailer defined inputs, simulation can be conducted to reveal the expected performance as measured by various metrics. The retailer also can use simulation as a mechanism for modifying its inputs to fully adapt to the implications of the outcomes of the simulations. The retailer can access the optimal size profiles and simulation environment through a user interface that interacts with the solution and simulation engines.

Data Gathering

For use in the process described above, the historical information 10 is first converted to a suitable format and stored in a relational database 12. The data stored in the database should cover a period that is typically two or three years for a range of merchandise items and stores. The period of time for which data is required may very, but periods of a year or shorter may not be as useful. Such shorter periods imply too little useful information about the historical patterns because they typically represent only a piece of the pattern. As the period for which data is available increases, the amount of available information increases.

Each item for which information is available may be associated with a unique SKU number. For example, a teenage girl's designer jeans in color blue and size 10 could be one item. The data for the jeans item could show daily dollar and unit sales by store location.

The information can be transferred from the retailer's computer to the relational database on tapes or electronically. The volume of data for a large number of items can be very large. The burden of transferring the data can be reduced by data compression. Large compression ratios can be achieved because a large percentage of the data "cells" (e.g., unit sales of one item on a single day in a single store) are empty.

Aggregation

To find useful patterns by size in the historical information, the information for different styles typically should be aggregated into style classes and subclasses in accordance with an item hierarchy 16. By doing this, the impact of "noise" that exists in information for an individual style may be reduced in the aggregate information, making it more straight forward to derive information about the size demand patterns inherent in the data. As a simple example, all items that are of similar styles but different colors could be aggregated into a class by size.

The database may be stored in any of a variety of formats, but it is useful to be able to query the database with a conventional query language such as SQL. SQL queries can be used to aggregate items into classes automatically.

The aggregation of items (we sometimes use the word items interchangeably with the word styles) is done in a way that reflects expected similarities in size patterns. Items that are expected to exhibit similar size patterns are aggregated. For example, men's outdoor boots of different styles that might be expected to have similar size demand patterns, may be aggregated. The aggregation may be done based on knowledge and experience of the retailer or by looking at the historical data for different styles.

The goal is to aggregate to a level that produces the best signal to noise ratio (e.g., 10%), that is, the best ratio of the mean to the root mean square of the resulting data. One way to choose styles to be aggregated is by cross-correlation analyses to find items whose sales' histories are strongly cross-correlated. Further aggregation of items beyond the level where the best signal noise ratio is achieved may be done to reflect the interests of business managers.

The class structure of items may be stored in a table in the relational database.

Hierarchies may be based not only on styles, but also on time periods (all sales by size within the Fall season), location (all stores in New Jersey), or on items (all junior sportswear styles), or on combinations of them.

Size Profile Function

Figure 2:
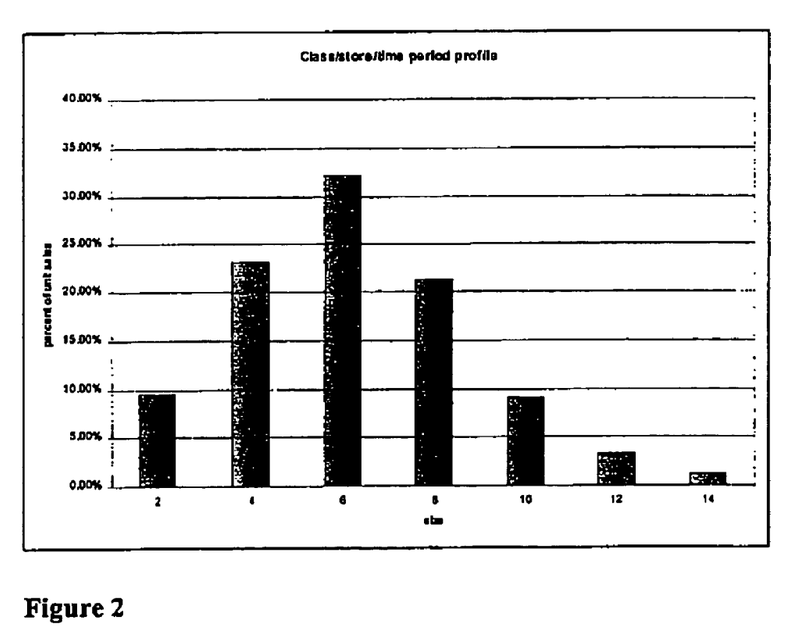
FIG. 2 shows a percentage profile.

A size profile gives the relative sales strengths of different sizes within a given style or class. FIG. 2 gives a typical size profile for a class of merchandise, where demand is highly concentrated in middle sizes and less so in the extreme sizes represented in the tails. The total percentage of sales presented by all of the bars 18 on the figure is 100%. Each of the bars 18 represents the mean percentage of sales across multiple items within a class for a given size, a given period, and a given location.

Based on all of the size profiles of the kind shown in FIG. 2 across all classes of merchandise for a season, it is possible to generate and display error bars 22 (e.g., FIG. 4) that indicate the confidence level of the mean profile 24 by size, capturing the magnitude of noise as a component of the calculated profile. For example, bar 22 on FIG. 4 indicates that for size 4, the mean percentage is 24% and the magnitude of noise represents a range of about 5% above and below the mean. These error bounds can be used to optimize the recommended size profile depending on the objectives of the retailer.

Figure 3:
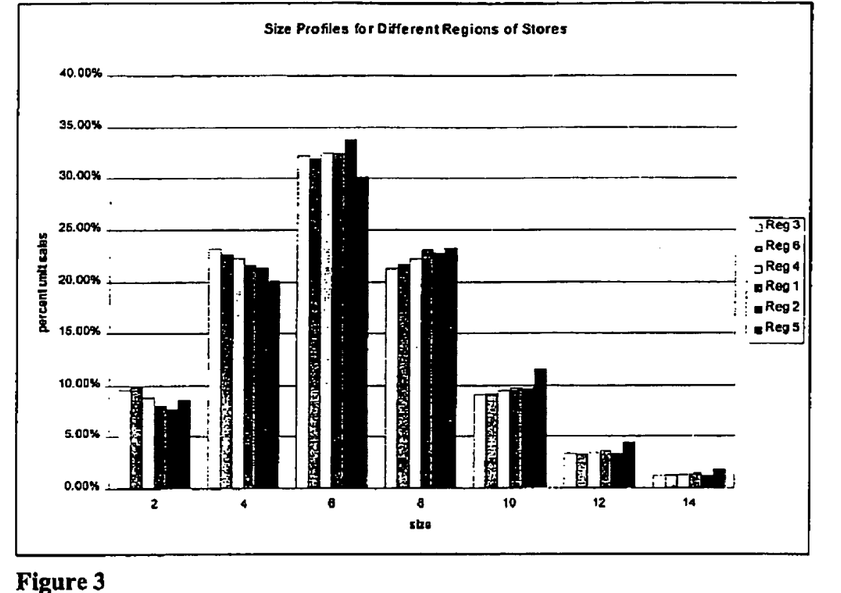
FIG. 3 shows a set of profiles.

Size profiles may vary by type of merchandise (girls SML sweaters have a different size profile than girls SML t-shirts), by location (girls SML sweaters have higher small-size contribution in New York than in California), and by time period (girls SML sweaters have different size profiles in the Fall than in the Spring). An example of size profile variations 60 by location (regions) is shown in FIG. 3 in which size profiles for a given class of merchandise and a given time period were grouped by region.

Size profiles model the historical demand for sizes in a given style/store/time-period. Retailers (or suppliers) can use these historical models to purchase and/or distribute sized merchandise for the same or similar future style/store/time-periods. Typically, size profiles need not be determined at the lowest level of time granularity, because (1) operational realities constrain retailers from recasting size profiles more than one or two times a year, and (2) sales trends by size are fairly consistent over time, and at small time increments the data are dominated by noise. For this reason, size profiles are calculated at the finest granularity level (e.g., weekly), and then averaged to smooth the intrinsic noise over a longer period of time (e.g., season). At the same time, error bounds are derived from the underlying distribution to capture the inherent noise level around the mean size profile.

Derivation of a Size Profile

Figure 6:
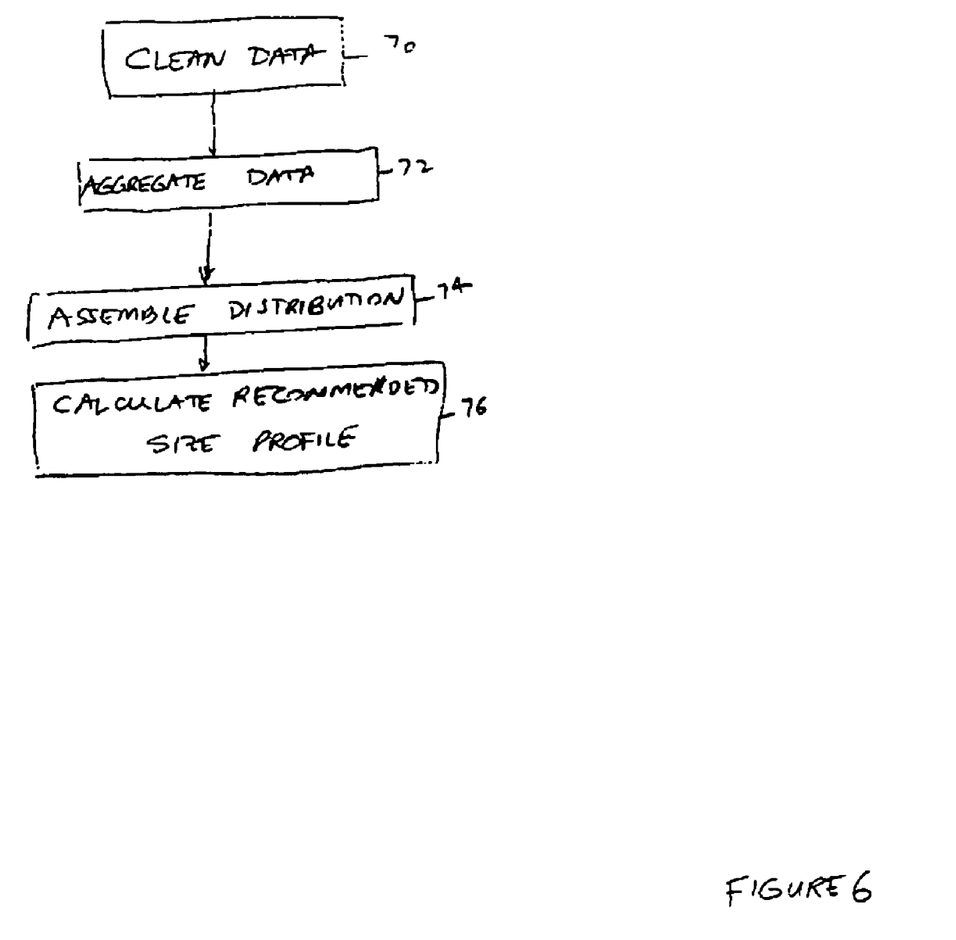
FIG. 6 shows a flow chart.

A size profile for a given style/store/time-period is derived from the aggregated historical information by an algorithm that reveals the underlying demand by size. As shown in FIG. 6, the algorithm includes four major steps: (1) "clean" the data 70 by removing biases introduced by historical errors in purchasing and/or allocation, (2) aggregate the data 72 to the appropriate merchandise level (e.g., class) by time period and calculate size profiles, (3) assemble the distribution of size profiles 74 for all size profiles over a given time period, and (4) calculate the recommended size profile 76 given the underlying distribution and relevant constraints.

Data Cleaning

The goal of the first step is to remove from the historical information any data that would mask the true underlying sales distribution for a given style. For example, while a customer who purchases a style in a given size is signaling demand that is captured, a customer who wishes to purchase that same style but cannot find his or her size walks away without recording this lost sale or any other indicator of the unmet demand for that size. Addressing this limitation in the historical data is critical, because otherwise any sizing decisions may serve to repeat the mistakes of the past.

The first step, then, is to build an analytical database that is essentially a "cleaned-up" version of the historical information. This is accomplished by stripping away all sales data for a given style in a given store that corresponds to any time period in which not all sizes were presented to customers. These time periods are characterized as having stock-out or near stock-out conditions for any size that exists for that style. (The stock-out criteria should be tuned for the retailer or data warehouse, because data integrity issues are common, and inventory numbers generally have some degree of error.) After cleaning, the remaining sales data capture demand in a supply-unconstrained environment, a more accurate measure of the relative demand by size.

Data Aggregation

After these biases have been eliminated from the historical information, the sales data for a given store in a given time period can be aggregated to an appropriate merchandise level above the style level (e.g., class, department). This is desirable if (1) there is insufficient data to calculate statistically meaningful size profiles at the style level or (2) the retailer or supplier intends to make purchasing or allocation decisions at a higher aggregation level (this is frequently the case). Size profiles are calculated by summing unit sales by size and then normalizing by total sales. The resulting characterization gives the percent of sales by size for a given style or class in a given store for a given time period. For simplicity, assume that the size profiles are to be derived at the class level, above the style level.

Assembling a Distribution of Size Profiles

Figure 4:
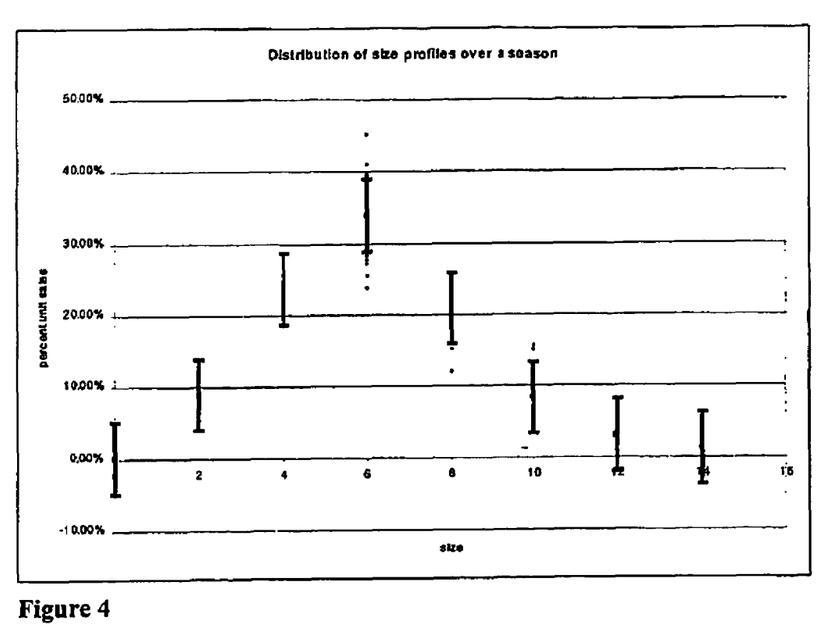
FIG. 4 shows a profile distribution.

Once the size profiles are generated at this lowest level of time granularity, the third step in the approach is to assemble the distribution of size profiles over a specified time period that is relevant given the time horizon for the retailer's (or supplier's) decision-making process. For instance, if a retailer is planning a purchase for merchandise in a given class to be delivered in the spring, all size profiles corresponding to weeks in the spring season contribute to the final size profile recommendation. When the appropriate size profiles have been identified for inclusion, a distribution of size profiles can be generated. Each size within a given class/store then has a spread of relative sales strengths, representing the volatility in observed supply-unconstrained demand for the overall time period. FIG. 4 shows an example of such a distribution.

Generation of Recommended Profile

The final step is to derive a recommended size profile for the class/store and time period, given both the parameters of the distribution and any additional inputs from the retailer or supplier that specify the desired allocation objectives. For instance, suppose that the size profiles for a given class/store combination over all weeks in a season are graphed, as in FIG. 4, and the observed sales percentages for each size z are normally distributed with mean mz and standard deviation in inverse proportion to the mean, sz=azmz. In other words, sales for sizes with high demand on average (typically the middle or medium sizes) will tend to be more stable than those with low demand (the extreme sizes).

If the objective in calculating a size profile is to determine the relative sales strength by size that is "most likely" to be realized in a season (time period) for a given class and store combination, then the final size profile is found by simply taking the mean mz for each size z. The high volatility in extreme sizes can lead to undesirable results, however, because the actual demand for these low volume sizes might be much higher (relatively speaking) than expected, leading to an early stock-out position of low volume sizes and resulting in lost sales and customer dissatisfaction, as well as broken presentation. Alternatively, the actual demand for these sizes might be relatively low, resulting in excessive inventory of difficult-to-sell extreme sizes that eventually are sold at the end of the season at a deep discount. The retailer is clearly faced with a trade-off between customer service (number of fill presentation periods) and profit.

Objective Function

A retailer's allocation strategies can be codified into an objective function that involves some of the following components: lost sales, lost margin through excessive markdowns, cost of capital, and operational costs. This objective function essentially assigns a value to the degree in which various allocation objectives, not limited to sales dollars and gross profits, are met. Once the objective function is clearly defined, the optimization problem then is to derive the size profile that maximizes the expected value for the retailer.

The optimization problem might be generally stated as searching for the vector of proportions $x_i$ of sizes (the size profile) that maximizes the expected value of the realized profit $\Pi$ minus some weighting factor $\alpha$ times a customer service function CS. For a given store/class, this function can be written as:

$$E\ [\Sigma_{style\ seClass}\{\Pi(Q_s, x_i, D_{iws}, p_{ws}, c_{ws}, \ldots)-\alpha CS\ (Q_s, x_i, D_{iws}, \ldots)\}],$$

where the function is evaluated over all styles in the class at that store. Here, $Q_s$ is the quantity purchased, $x_i$ is the size profile (what we're solving for), $D_{tws}$ is the function that represents demand per week and size, $p_{ws}$ is the weekly selling price (including any promotions or markdowns), and $c_{ws}$ is the weekly cost, which might include any carrying or operational costs. (Note that other variables could be included in the calculation of either profit or customer service as defined by the retailer's unique objectives and data.) The profit component Π of the equation sums the weekly achievable sales dollars less cost, subject to the given total purchase quantity and assigned size profile. The customer service piece CS can be formulated in different ways. One such function might calculate the number of weeks between the style's total stockout (or outdate) and the first week that any size stocks out (the size break week). A high level of customer service with respect to size availability would clearly have a small value of CS. The parameter a then represents the weight that the retailer places on remaining in stock. For instance, setting $\alpha=0$ implies that the retailer puts no weight on remaining in stock, so that the retailer's objective is to find the size profile that maximizes expected profit.

The complexity of the objective function (as described above) and the specifications of the size profile distribution will dictate the appropriate optimization approach. The range of possible solution approaches is wide, as the optimal solution could be an analytical one that is solved directly, or could be so complex as to require simulation for accurate evaluation.

At the conclusion of this process, size profiles are generated for each class/store/time-period combination. These size profiles provide retailers (or suppliers) with a means to determine the optimal purchase or apportionment of units by size given their customers' historical demand patterns in combination with their strategic inventory objectives.

Clustering Size Profiles

The algorithm described above generates optimal size profiles for each class/store/time-period combination given specific business objectives. While each of these size profiles might be unique, it is not generally feasible for retailers to implement an unconstrained number of different profiles. Typically, system limitations prohibit more than a small number of predefined size profiles from being entered into the system and then used for purchasing or allocation decisions. This constraint produces an unavoidable degree of suboptimality, because the optimal size profiles generated for each class/store/time-period are not implementable. To minimize the loss of accuracy, the size profile distributions generated from the historical information can be clustered in an optimal way, again incorporating the retailer's objective function as described in the previous section. The remainder of this section describes first how the total value (as measured according to the retailer's allocation objectives) of a given set of clusters can be calculated and then how an optimal set of clusters is found.

Given a large number of class/store/time-period size profiles, clustering involves dividing the total set of size profile distributions into a small number of subsets, or clusters, of size profiles with the intention of mapping each one to a single size profile. The value for each member of the cluster is found by calculating (or simulating) the expected value of the retailer's objective function (as described in the previous section) given that the cluster size profile will be applied. For any given cluster then, the optimal representative size profile is the one that maximizes the sum of the values of all members of the cluster.

Thus, for a given division of class/store/time-period profiles into R clusters, an optimal set of representative profiles can be generated for the set of clusters, yielding a total value calculation for that cluster assignment. The objective is to find the set of clusters, or partitions of class/store/time-period size profiles into groups, that has the maximum total expected value. This optimization can be performed by a variety of optimization algorithms. For example, the genetic algorithm can be used to search for the optimal solution.

For a simple optimization problem, a variety of genetic algorithm packages may be used to find the optimal solution, for example, one that uses the concept of vectors of real numbers for the genetic structures. Then, the search parameters can be directly evaluated in the program to obtain the optimal solution. For more complex and time-consuming problems, parallel genetic optimization techniques can be used to speed up the search for an optimal solution. For parallel processing, the Message-Passing Interface Standard (MPI) system may be used on a cluster of LINUX systems. MPI is based on the concept of multi-computer processes communicating with one another through the message passing system in a network. Processing may be done using a genetic algorithm that relies on the MPI system for the parallel processing.

A single central optimization is performed with computations done iteratively and distributively. Initially, a set of R clusters is generated, partitioning the class/store/time-period size profiles. Next, the maximum value for that set of clusters is calculated, as described above. The optimal set of clusters (having a global maximum value) is found using the genetic algorithm. In applying the genetic algorithm, various populations representing different possible clusters are distributed to different processing threads so that the optimization work can be done in parallel and therefore in a shorter amount of time.

Figure 5:
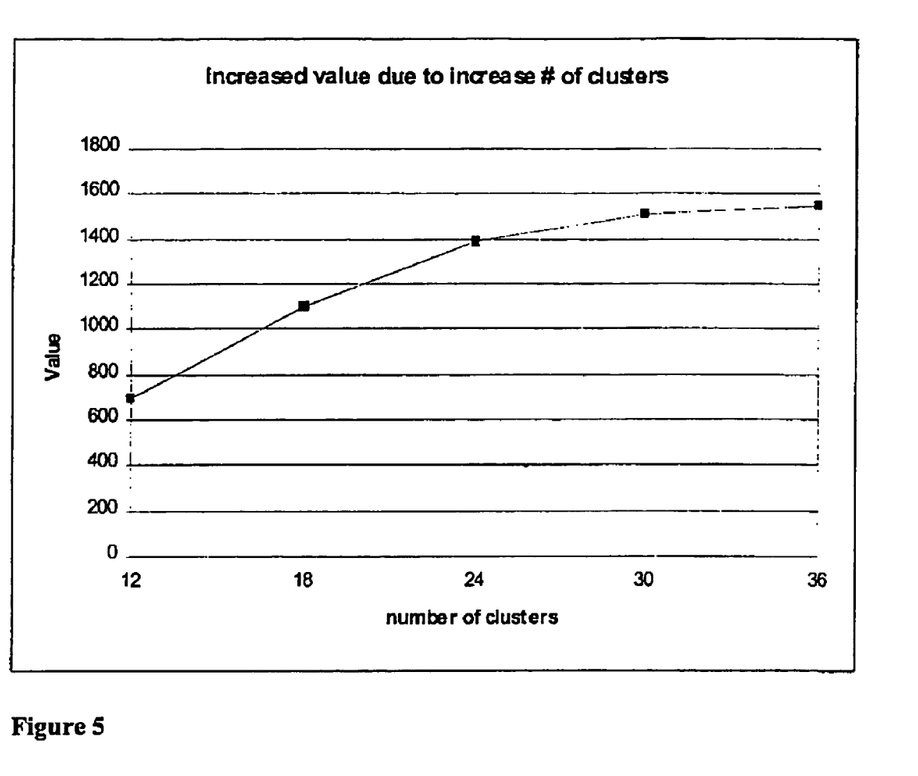
FIG. 5 shows a graph of value versus number of clusters.

For any specified number of clusters R, the process described above finds a set of R clusters of class/store/time-period profiles that maximizes the total value, as defined by the retailer's unique allocation objectives. By increasing the number of clusters, the retailer can achieve even more value. However, there typically exists a value of R that is an inflection point beyond which the incremental value of adding to the number of clusters is very small. By charting and analyzing the optimized values for successive values of R it is possible to identify the number of clusters that corresponds to this inflection point. If it is operationally feasible, this is the most economic solution and should by implemented by the retailer. FIG. 5 shows an example of such a chart, showing the incremental benefit in terms of value as the number of clusters is increased.

Risk Assessment and Simulation

The approach described above will result in the generation of size profiles that seek to optimally match the expected consumer demand by size, subject to the retailer's specific allocation objectives. Before deploying these size profiles, it is often desirable to test the size profile recommendations in a simulation environment, effectively playing out an entire season (or other relevant time period) of allocations. There are several reasons why such a simulation might be required. Three important uses are (1) deriving the risk profile associated with a set of optimal size profiles, (2) illustrating the results from using alternative approaches for setting size profiles, and (3) allowing retailers to tune their objective function and constraints by showing the implications of their inputs.

Since there is inherent uncertainty in the actual demand by size, simulation can be used to explore the optimal solution in depth by deriving the risk profile for an optimal set of size profiles. The uncertainty in demand by size for each class/store/time-period (as captured in the analysis of the historical information) can be used to generate a large number of alternative scenarios, each of which can be evaluated using to the retailer's objective function. At the conclusion of this large-scale simulation, the distribution of values (measuring gross profit, customer service, activity costs, etc.) can be charted, showing the certainty of the expected value. This knowledge prepares retailers for a variety of outcomes.

Simulation can also be conducted to test the expected performance of implementing alternative size profiles. More specifically, different approaches for generating size profiles can be coded and those size profiles run through the simulator. The expected performance for the alternative set of size profiles can then be illustrated by charting the results for thousands of possible outcomes. This type of simulation is often applied at the end of a season, in order to quantify the value that was achieved by using the optimal size profiles, as opposed to the value that would have been realized using the retailer's typical size profiles.

A third use for simulation is as a testing environment for the retailer to observe the impact of its constraints or objective function and modify these as needed. For instance, a retailer may not realize that the heavy weight that they are placing on customer service generates size profiles that will generally result in high end-of-season inventories in some difficult-to-sell sizes. Armed with the results of the simulation, the retailer might rethink its rules or objectives to avoid undesirable unanticipated consequences. The simulation environment can also allow retailers to see the impact of increasing or decreasing the number of size profile clusters.

Figure 7:
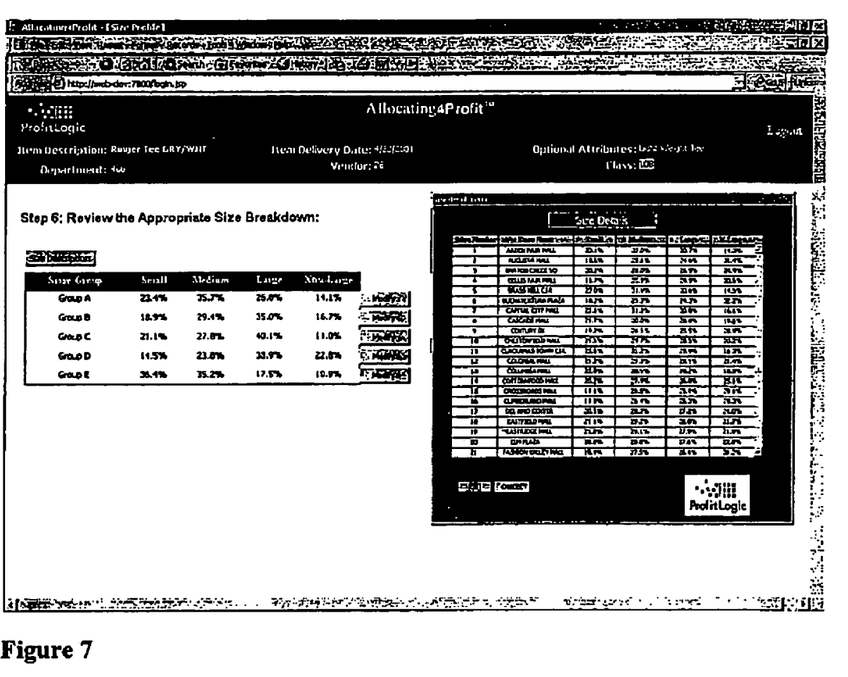
FIG. 7 shows a screen shot.

The screen shot shown in FIG. 7 gives an example of how retailers can be presented with the recommended size profiles for allocating a style (from a given class) to each store. These default recommendations are generated according to a predefined objective function with its set of assumptions. The user interface can be extended to allow the retailer to run alternative scenarios through the simulation environment and observe the impact in terms of meaningful metrics. For instance, the user might elect to vary the number of different size profiles, the customer service objectives, or might even manually change the actual size profiles themselves, or the way stores are assigned to profiles. The impact of such changes can be measured in terms of the expected change in important metrics like sales dollars, gross profit, size break week, or stockout week. The user then can decide whether to accept the original recommendations or override them based on new simulations.

Other implementations are within the scope of the following claims.

The invention claimed is:

1. A method comprising the computer implemented steps of:
    storing historical information about demand behavior associated with different sizes of styles of items of commerce;
    aggregating the historical information for one or more classes, each class associated with one or more styles and each class containing historical information about demand behavior associated with sizes for one or more styles associated with the class;
    generating one or more size profiles for each class from historical information associated with the class;
    generating a distribution of the size profiles for each class from the one or more size profiles generated for the class; and
    generating a size assortment recommendation for each class from the distribution of size profiles for that class and on one or more objectives with respect to purchase or allocation decisions about assortments of the different sizes, the one or more objectives including an objective function, the objective function identifying a vector of proportions of sizes that represents a maximum expected value of a realized profit minus a weighting factor times a customer service function, the customer service function being a function of a number of time periods between total stock-out of a style and a first time period that any size of that style stocks out.

2. The method of claim 1 also including:
    generating the size assortment recommendation based also on operational constraints associated with the purchase or allocation decisions.

3. The method of claim 2 in which the operational constraints include a limitation on the granularity of purchase and allocation decisions that can be implemented.

4. The method of claim 1 in which the historical information is stored separately for each style offered at each of multiple commerce locations.

5. The method of claim 1 in which the historical information is stored separately for each style offered in multiple time periods.

6. The method of claim 1 in which the generation of a size assortment recommendation includes determining size profiles, each size profile representing a distribution of percentages of sales by size within one of the styles.

7. The method of claim 6 also including:
    generating error bound information from size profiles for multiple styles and multiple time periods.

8. The method of claim 7 also including:
    using the error bound information to optimize size profiles based on the objectives.

9. The method of claim 1 in which the generation of a size assortment recommendation includes:
    determining size profiles representing a distribution of percentages of sales by size within one of the styles; and
    optimizing the number of size profiles by assigning them to groups.

10. The method of claim 9 also including substituting a representative size profile for all of the size profiles of each of the groups.

11. The method of claim 9 in which the optimization is based on one or more of the objectives.

12. The method of claim 11 in which the optimization is based on a genetic algorithm.

13. The method of claim 9 in which the optimization yields a determination of an optimal number of groups.

14. The method of claim 1 in which the size assortment recommendation is an optimal assortment, and also including performing simulations on the optimal assortment to derive a risk profile of outcomes.

15. A method comprising the computer implemented steps of:
    displaying to a user one or more recommended size profiles for allocating a style of an item of commerce to retail outlets based on a predefined objective function;
    enabling the user to specify alterations in an analysis that formed a basis of a first recommended size profile in the one or more recommended size profiles;
    based on the specified alterations and one or more objectives, resolving for a second recommended size profile on a per location, per class, per time period basis, the one or more objectives including an objective function, the objective function identifying a vector of proportions of sizes that represents a maximum expected value of a realized profit minus a weighting factor times a customer service function, the customer service function being a function of a number of time periods between total stock-out of a style and a first time period that any size of that style stocks out; and based on the first recommended size profile and the second recommended size profile, displaying to the user the impact of the alterations in terms of sales dollars, gross profit, size break week, or stock-out week.

16. A method comprising the computer implemented steps of:
   A. obtaining historical information about sales associated with each of one or more different sizes of styles of items of commerce,
   B. determining historical demand behavior associated with the different sizes of styles of items of commerce by filtering the historical information about sales of those styles of items of commerce to remove sales data for each of one or more styles in each of one or more locations that correspond to one or more time periods in which not all sizes of that style were presented to customers in that time period at that location,
   C. generating a size assortment recommendation based on
      i) the historical demand behavior and on
      ii) one or more objectives with respect to purchase or allocation decisions about assortments of the different sizes,
   D. the step of generating a size assortment recommendation including:
      identifying a plurality of size profiles, each maximizing on a per location, per time period, per class basis an expected value of realized profit minus a weighting factor times a customer service function,
      where the customer service function is a function of a number of time periods between total stock-out of a style and a first time period that any size of that style stocks out, and
      where a class comprises one or more styles and a location comprises one or more retail locations.

17. The method of claim 16 also including:
   generating the size assortment recommendation based also on operational constraints associated with the purchase or allocation decisions.

18. The method of claim 17 in which the operational constraints include a limitation on the granularity of purchase and allocation decisions that can be implemented.

19. The method of claim 18 in which the generation of a size assortment recommendation includes:
   determining size profiles, each size profile representing a distribution of percentages of sales by size within one of the styles; and
   optimizing the number of size profiles by assigning them to groups.

20. The method of claim 19 also including substituting a representative size profile for all of the size profiles of each of the groups.

21. The method of claim 19 in which the optimizing is based on the objectives.

22. The method of claim 21 in which the optimizing is based on a genetic algorithm.

23. The method of claim 19 in which the optimizing yields a determination of an optimal number of groups.

24. The method of claim 16 in which the historical information about sales is stored separately for each style offered at each of multiple locations.

25. The method of claim 16 in which the historical information about sales is stored separately for each style offered in multiple time periods.

26. The method of claim 16 in which the generation of a size assortment recommendation includes determining size profiles, each size profile representing a distribution of a percentage of sales by within one of the styles.

27. The method of claim 16 in which the size assortment recommendation is an optimal assortment, the method also including the step of performing simulations on the optimal assortment to derive a risk profile of outcomes.

* * * * *